United States Patent

Gottschalk et al.

[11] 3,733,575
[45] May 15, 1973

[54] CLAMPING CONNECTOR FOR BUS BARS

[75] Inventors: Friedrich Gottschalk; Otto Wildgruber, both of Erlangen, Germany

[73] Assignee: Siemens Aktiengesellschaft, Berlin, Germany

[22] Filed: Feb. 9, 1972

[21] Appl. No.: 224,692

[30] Foreign Application Priority Data

Feb. 25, 1971 Germany..................P 21 08 920.3

[52] U.S. Cl. ..............339/22 B, 85/50 R, 174/84 S, 287/189.36 F, 339/247
[51] Int. Cl. ................................................H01r 13/60
[58] Field of Search ....................339/22 B, 245, 246, 339/247, 249, 266; 52/584; 85/50; 287/189.36 F, 189.36 C; 174/84 S, 88 S, 94 S; 24/73 SP, 248 SA, 81 CC

[56] References Cited

UNITED STATES PATENTS

| 1,307,973 | 6/1919 | Hester | 52/584 X |
| 2,945,137 | 7/1960 | Farnsworth | 339/22 B |
| 2,952,729 | 9/1960 | Wheeler | 174/94 S X |
| 3,012,091 | 12/1961 | Schiffmann | 174/94 S |
| 3,178,675 | 4/1965 | Gutshall | 339/246 |
| 3,267,631 | 8/1966 | Hammitt | 52/584 X |
| 2,159,154 | 5/1939 | Hixon | 339/266 L |

FOREIGN PATENTS OR APPLICATIONS

| 1,368,424 | 6/1964 | France |
| 909,717 | 4/1954 | Germany |

*Primary Examiner*—Marvin A. Champion
*Assistant Examiner*—Robert A. Hafer
*Attorney*—Jerome R. Cox

[57] ABSTRACT

A clamping connector is provided for connecting bus bars, which includes a pressure plate having a planar contact with the bus bars and a domed pressure piece which is formed so as to connect bus bars of different cross sections. The clamp bolt or bolts are disposed within flanges of the pressure plate, which are arranged between the bus bars to be connected and which the bus bars engage on both sides.

6 Claims, 6 Drawing Figures

CLAMPING CONNECTOR FOR BUS BARS

A clamping connection between bus bars of rectangular cross section may be obtained by means of pressure plates and pressure pieces with the aid of clamping bolts.

It is an object of the present invention to provide a clamping connection, by means of which bus bars of different cross sections may be connected with one another without having to drill through the bus bars.

The solution of this problem is attained by means of a clamp connector, which essentially includes a pressure plate engaging one side of the bus bars to be connected; a pressure piece engaging the other side of the bars; a thrust shim overlying the pressure piece, and a clamp bolt extending through the pieces named above.

With these and other objects in view, which will become apparent in the following detailed description, the present invention will be clearly understood in connection with the accompanying drawings, in which.

Figure 3:
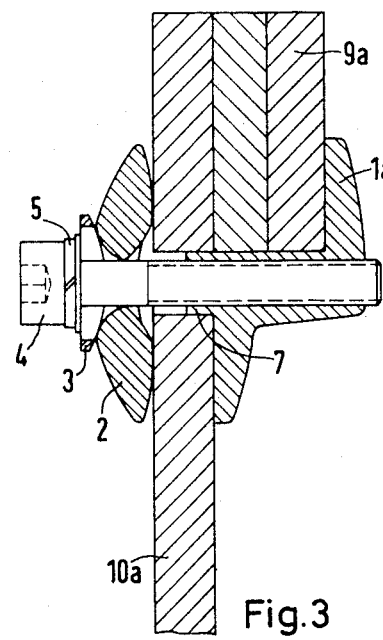
Figure 4:
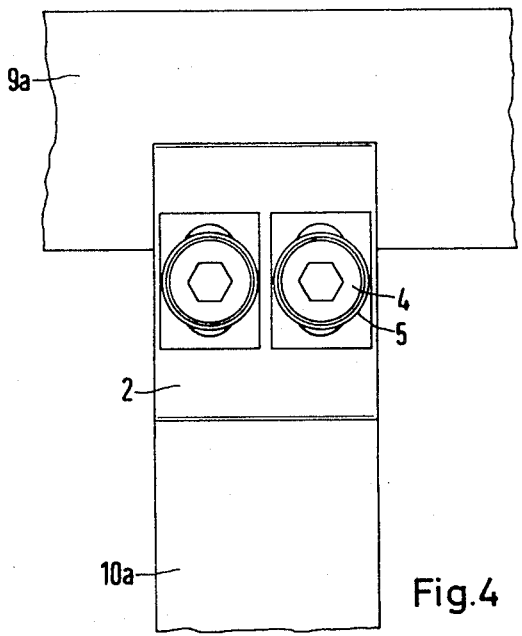
Figure 5:
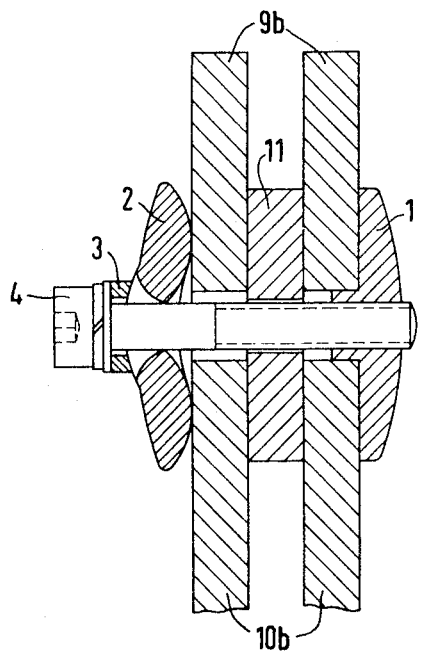
Figure 6:
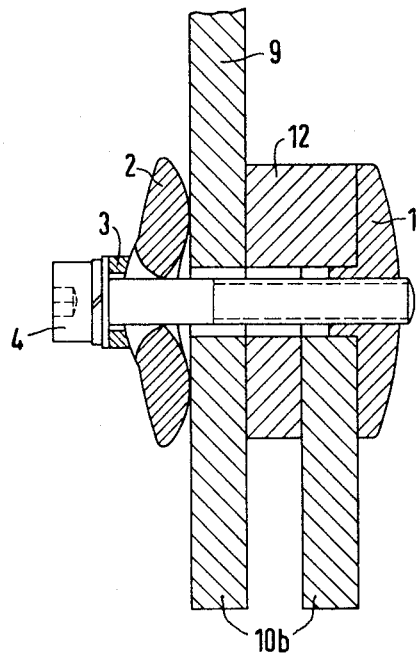

FIGS. 3 and 4, similarly show a view in cross section and in plan of a proposed connection for bus bars having a considerable difference in cross-sections;

FIG. 5 is a view in cross section of a clamping connection for two parallel and spaced bus bars including a specially shaped pressure shim; and FIG. 6 is a view in cross section of a proposed arrangement of the clamping connection, wherein two parallel and spaced bus bars are connected to a single bar of small cross section.

Figure 1:
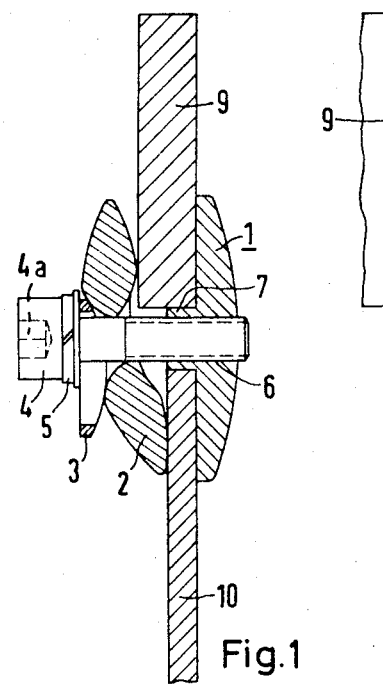
FIG. 1 shows a view in cross section of a clamping connector as proposed, applied to two bus bars of unequal cross sections.
Figure 2:
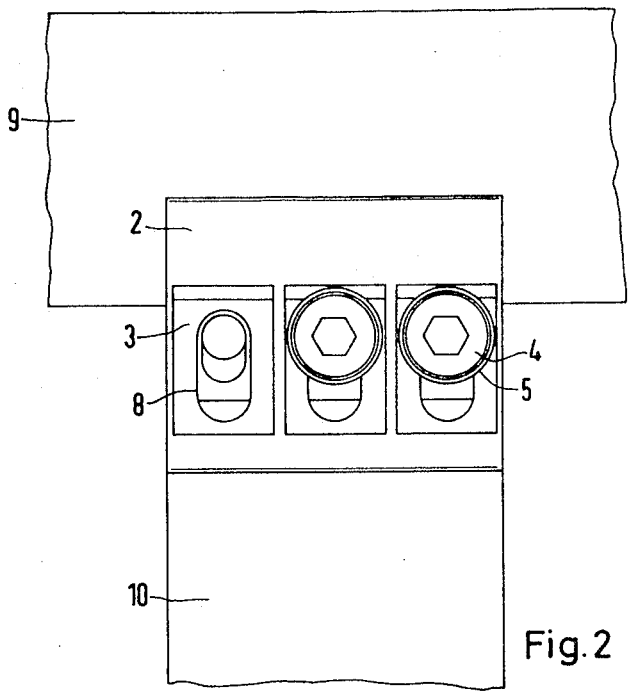
FIG. 2 is a plan view of the arrangement of FIG. 1.

The clamp connector, as assembled, is shown in FIGS. 1 and 2 and consists of a pressure plate 1, a pressure piece 2, a pressure shim 3, as well as a clamping bolt 4. The bolt extends through a spring washer 5, the pressure shim 3 and an aperture in the pressure piece 2 into the threaded bore 6 of the pressure plate 1. The threaded bore 6 is disposed at about the center of the pressure plate 1, at a place having an enlarged cross section which is formed into a flange 7. It may be seen from FIG. 2 that the pressure plate 1 and the pressure piece 2 comprise an essentially rectangular plan shape and may, as desired, receive two, three or more clamping bolts. The pressure shin 3 is provided with a slotted hole 8 which makes it possible for the clamping bolt 4, with a hexagonal recess 4a, to be inserted with different angular positions of the pressure piece 2. While the pressure plate 1, on its sides facing the bus bars 9 and 10 is provided with plane surfaces, the pressure piece 2 has an arched surface facing the bus bars 9 and 10, so that both equal and different cross sections of the bus bars may be connected with the same connector.

Whenever the cross sections of the bus bars have too great a difference, another form of construction of the pressure plate may be used. Such a form of the pressure plate 1a is shown in FIGS. 3 and 4. In this case, the surfaces of the pressure plate facing the bus bars 9a and 10a are no longer in the same plane, but are located in planes parallel to one another. The flange 7 is again formed in such a manner that it extends between bus bars 9a and 10a and thereby fixes their spacing. The pressure piece 2, in this case, has a planar disposition so that the clamp bolt 4 is disposed in the center of the slotted hole 8 in the pressure shim 3.

The pressure piece 2, as is evident from FIGS. 1 and 3, has a bore which is enlarged at the ends, which makes it possible to push the clamp bolt 4 therethrough for various angular positions of the pressure piece 2. The arched surface of the pressure shim 3 makes it possible, for different angular positions of the pressure piece 2, to maintain the planar side of the pressure shim 3 facing the head of clamp bolt 4, always at right angles with respect to the axis of the clamp bolt, so that a one-sided stressing of the clamp bolt 4 is avoided. The bore, or as the case may be, the bores, in the pressure piece 2 have to be enlarged only in one direction toward the ends, since the pressure piece 2 is required to be pivotable only about the horizontal axis, as in FIGS. 2 and 4. The special advantage of the pressure connector, as described, apart from the universal applicability to bus bars of different cross section, is to be found in that no fixed connecting positions and no bores for fastening of the connector have to be provided.

A further embodiment with a concavely arched surface of the pressure shim 3 is shown in cross section in FIGS. 5 and 6.

In the embodiment, as in FIG. 5, bus bars 9b and 10b are connected each consisting of two parallel and spaced bar portions. The clamping connector here, too, consists of pressure plate 1, pressure piece 2 and pressure shim 3 and a clamp bolt 4. The clamping arrangement is here further enlarged by means of a spacer piece 11 also provided with a bore for the insertion of clamp bolt 4. The spacer 11 is disposed between the bus bar portions of the bus bars 9b and 10b. The surface of the pressure shim 3 which comprises a concavely arched dome surface facing the pressure piece 2 in contrast to the embodiment having a convex arc in the pressure shim 3 has the advantage that for a corresponding configuration of the arc of the pressure piece 2 a larger contact surface is obtained between pressure piece 2 and pressure shim 3.

The spacer 11, when given a certain configuration, may replace the form of the pressure plate 1a as shown in FIG. 3. An exemplified embodiment of this concept is shown in FIG. 6. The same elements are here provided with the same reference numerals as in FIGS. 1 to 4. As an addition, there is here provided a spacer piece 12 disposed between the bus bars 9 and 10b, for the purpose of equalizing the different dimensions of the bus bars 9 and 10b. The spacer 12 is provided with a raised portion, so that, within the range in which it engages the bus bar 9, there is available a greater thickness viewed in the direction of the bore than in the range in which it engages bus bar 10b.

The advantage of an additionally provided spacer piece is to be found in that the pressure plate 1 may be made uniformly common to all bus bar connections.

Furthermore, it is quite sufficient for the spacers 11 or 12 to consist of conducting material. No special hardness for the material used therefor is required, since it is only subject to compression.

In order to obtain a better contact and for the increase of friction between the adjacent parts, the surfaces of the individual parts making up the clamping connector may be roughened or ribbed.

While we have disclosed several embodiments of the present invention, it is to be understood that these embodiments are given by example only and not in a limiting sense, the scope of the present invention being determined by the objects and the claims.

We claim:

1. A clamping connector for bus bars having a rectangular cross section, comprising a pressure plate having two portions for engaging one side of each bus bar respectively, said plate having a bore disposed intermediate said two portions, the surfaces of said portions facing the bus bars being planar, a pressure piece for engaging the other side of each bus bar having two arched contact pressure flanks facing said bus bar and an aperture in said piece intermediate said flanks having enlarged opposed ends, a clamping bolt extending through the aperture in said pressure piece and into the bore of said pressure plate, and a pressure shim disposed between the head of said bolt and said pressure piece having a slotted aperture therethrough and an arched contact making surface facing said pressure piece, whereby said shim may be shifted with respect to said bolt and said pressure piece.

2. The connector according to claim 1, further including projecting flange means adjacent said bore for receiving said bolt disposed in assembled condition intermediate the ends of the bus bar to be connected and disposed on said pressure plate.

3. The connector according to claim 1, wherein said two pressure plate portions are displaced with respect to one another and are disposed in parallel planes.

4. The connector according to claim 1, further including a spacer disposed between said pressure plate and said pressure piece, said spacer having a bore for accommodating said bolt.

5. The connector according to claim 1, wherein said pressure shim has a side facing said pressure piece which is convex.

6. The connector according to claim 1, wherein said pressure shim has a side facing said pressure piece which is concave.

* * * * *